United States Patent
Pang et al.

(10) Patent No.: US 10,554,311 B2
(45) Date of Patent: Feb. 4, 2020

(54) METHOD AND SYSTEM FOR WAVEGUIDE DELAY BASED EQUALIZATION WITH OPTICAL SPLITTING IN OPTICAL COMMUNICATION

(71) Applicant: Luxtera, Inc., Carlsbad, CA (US)

(72) Inventors: Simon Pang, Carlsbad, CA (US); Joseph Balardeta, Encinitas, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 16/100,508

(22) Filed: Aug. 10, 2018

(65) Prior Publication Data

US 2019/0052370 A1 Feb. 14, 2019

Related U.S. Application Data (60) Provisional application No. 62/544,791, filed on Aug. 12, 2017.

(51) Int. Cl.
| | |
|---|---|
| *H04B 10/00* | (2013.01) |
| *H04B 10/69* | (2013.01) |
| *H04B 10/25* | (2013.01) |
| *H04J 14/00* | (2006.01) |

(52) U.S. Cl.
CPC ......... *H04B 10/6971* (2013.01); *H04B 10/25* (2013.01)

(58) Field of Classification Search
CPC ................................ H04B 10/66; H04B 10/67
See application file for complete search history.

(56) References Cited

U.S. PATENT DOCUMENTS

| | | | |
|---|---|---|---|
| 2013/0045016 A1* | 2/2013 | Doran | H04B 10/50 398/214 |
| 2013/0236195 A1* | 9/2013 | Ryf | H04B 10/615 398/208 |

OTHER PUBLICATIONS

Notification of Transmittal of the International Search Report and the Written Opinion of the International Searching Authority, or the Declaration, PCT Application PCT/US18/46298, International Filing Date Aug. 10, 2018, Search Report dated Oct. 26, 2018.

* cited by examiner

*Primary Examiner* — Daniel G Dobson
(74) *Attorney, Agent, or Firm* — McAndrews, Held & Malloy (57) ABSTRACT

Methods and systems for waveguide delay based equalization with optical splitting in optical communication may include an optoelectronic circuit comprising an input waveguide, a directional coupler, an optical delay, photodetectors, a current mirror, and a transimpedance amplifier. The optoelectronic circuit may receive an input optical signal via the input waveguide, split the input optical signal into first and second output signals using the directional coupler, delay the first output signal using the optical delay, convert the delayed first output signal to a first electrical signal using a first photodetector, convert the second output signal to a second electrical signal using a second photodetector, amplify the second electrical signal using the current mirror, and sum the first and second electrical signals at inputs of the transimpedance amplifier to generate an output voltage.

24 Claims, 10 Drawing Sheets

METHOD AND SYSTEM FOR WAVEGUIDE DELAY BASED EQUALIZATION WITH OPTICAL SPLITTING IN OPTICAL COMMUNICATION

CROSS-REFERENCE TO RELATED APPLICATIONS/INCORPORATION BY REFERENCE

This application claims priority to and the benefit of U.S. Provisional Application 62/544,791 filed on Aug. 12, 2017, which is hereby incorporated herein by reference in its entirety.

FIELD

Aspects of the present disclosure relate to electronic components. More specifically, certain implementations of the present disclosure relate to methods and systems for waveguide delay based equalization with optical splitting in optical communication.

BACKGROUND

Conventional approaches for signal equalization may be costly, cumbersome, and/or inefficient—e.g., they may be complex and/or time consuming, and/or may have limited responsivity due to losses.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for waveguide delay based equalization with optical splitting in optical communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
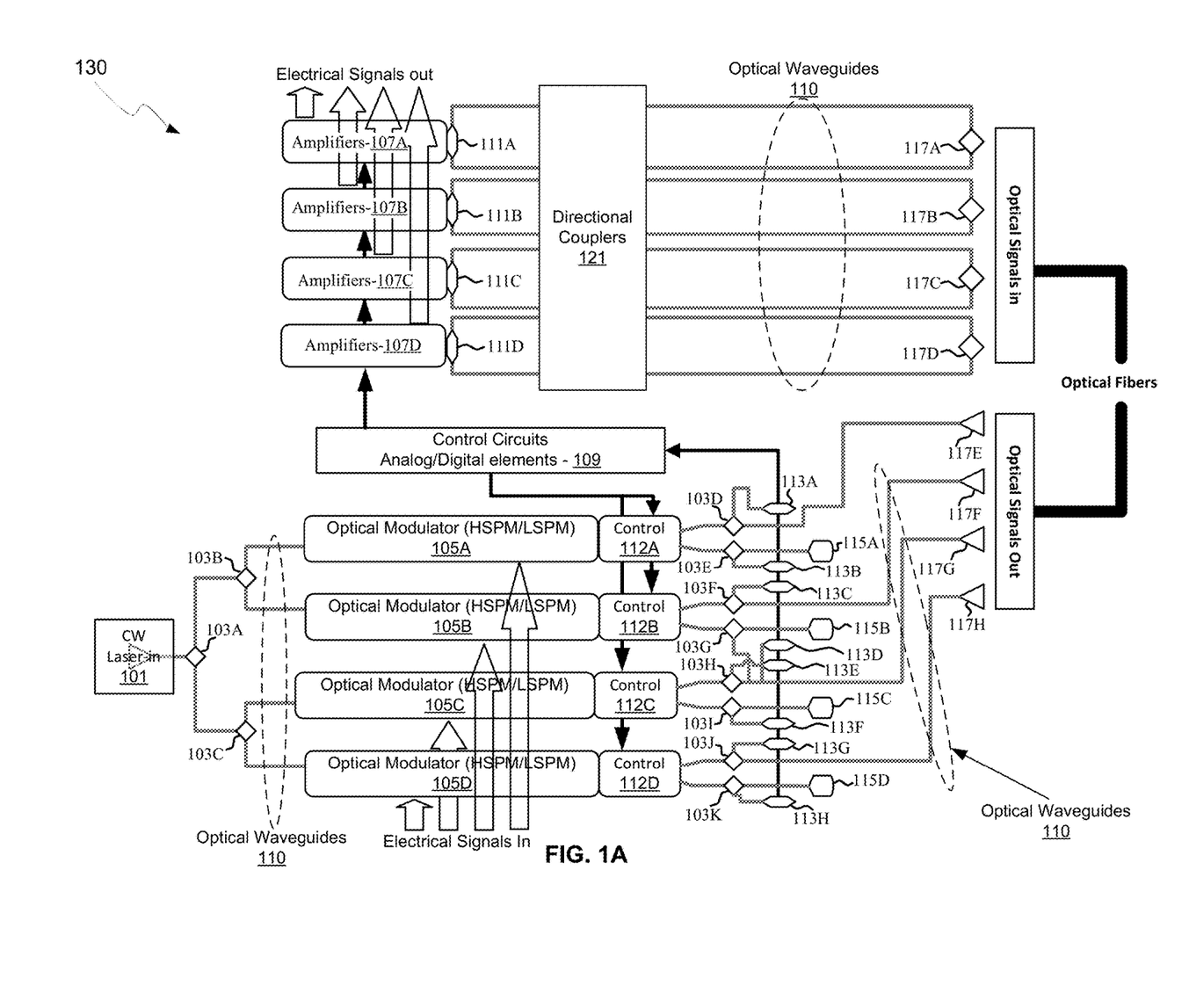
FIG. 1A is a block diagram of a photonically-enabled integrated circuit with waveguide delay based equalization using optical splitting in optical communication, in accordance with an example embodiment of the disclosure.

FIG. 1A is a block diagram of a photonically-enabled integrated circuit with waveguide delay based equalization using optical splitting in optical communication, in accordance with an example embodiment of the disclosure. Referring to FIG. 1A, there is shown optical and optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, directional couplers 121, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises one or more CMOS die with a laser assembly 101 coupled to the top surface of the IC 130. The laser assembly 101 may comprise one or more semiconductor lasers with isolators, lenses, and/or rotators for directing one or more continuous wave ("CW") optical signals to the coupler 103A. The photonically enabled integrated circuit 130 may comprise a single die (chip), or may be integrated on a plurality of die (chips), such as one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the tens of Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is optimized.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
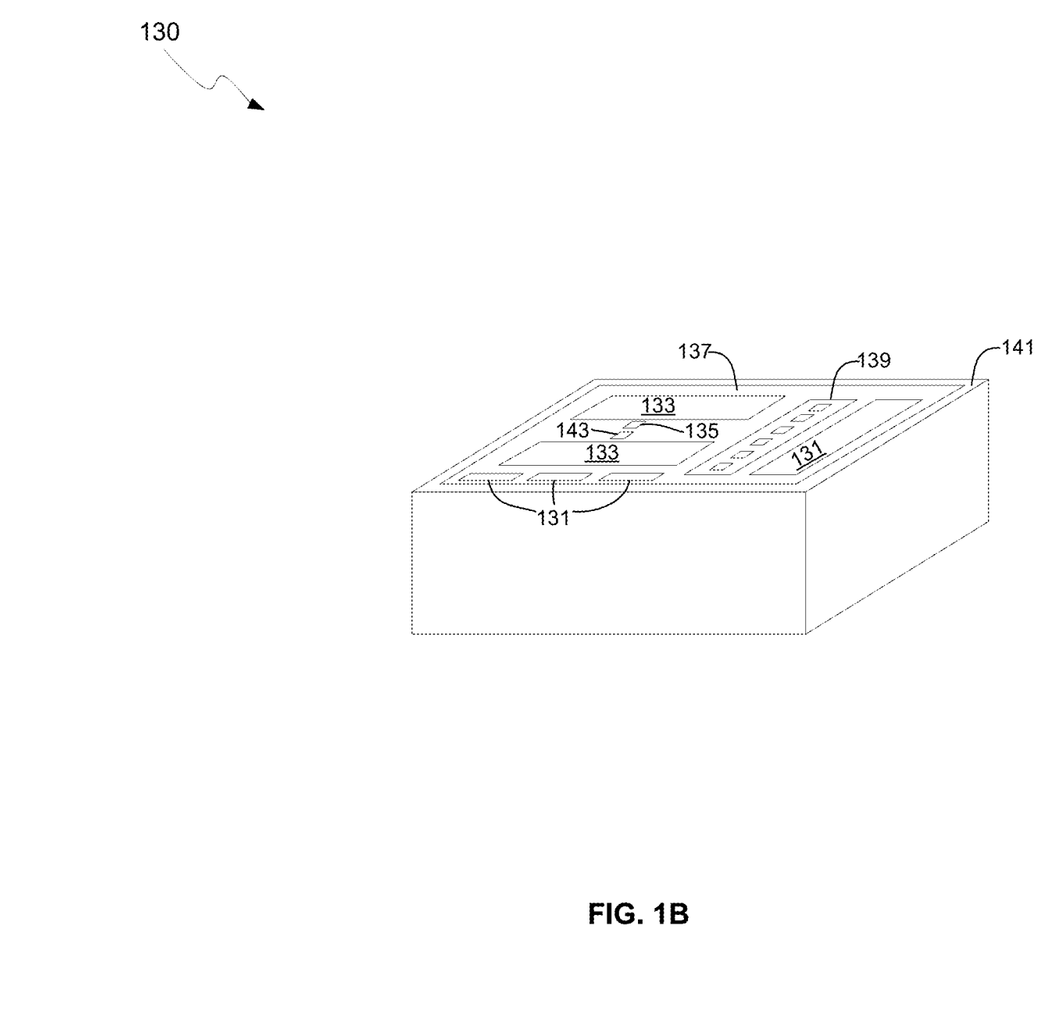
FIG. 1B is a diagram illustrating an exemplary photonically-enabled integrated circuit, in accordance with an example embodiment of the disclosure.

In another example embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The directional couplers 121 may receive an optical signal in one or more inputs and couple output optical signals to one or more outputs. In this manner, a single optical signal may be split between two output waveguides 110, for example. In addition the directional couplers 121 or waveguides 110 may comprise optical delay elements to enable optical equalization in conjunction with the photodiodes 111A-111D and amplifiers 107A-107D. This is shown further with respect to FIGS. 3-7. The photodiodes 111A-111D may convert optical signals received from the grating couplers 117A-117D, via the directional couplers 121, into electrical signals that are communicated to the amplifiers 107A-107D for processing.

In the receiver subsystem implemented in a silicon chip, light is often coupled into a photodetector via a polarization-splitting grating coupler that supports coupling all polarization states of the fiber mode efficiently. The incoming signal is split by the PSGC into two separate waveguides in a polarization-diversity scheme, and therefore both inputs to the waveguide photodetectors are used. If two different PSGCs are required to couple into the same photodetector, then the photodetector has four separate waveguide ports.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. In another embodiment, the photonically-enabled photonic circuit 130 may be divided into different die, with electronics on one or more die, and optical and optoelectronic devices on a photonics die. The signal processing functionality may include modulating the optical carrier, detecting the optical signal, splitting or combining data streams, and multiplexing or demultiplexing data on carriers with different wavelengths, and equalizing signals for reducing and/or eliminating inter-symbol interference (ISI), which may be a common impairment in optical communication systems.

ISI may be introduced by a channel and/or the transmitter/receiver of the optical system, and can limit the maximum speed of the communication system. An equalizer may be utilized to mitigate ISI, and may comprise waveguide delay-based equalization. Equalizers may utilize delay elements and weight elements applied to each delayed signal, which may then be summed for an equalized signal with mitigated ISI. In an example scenario, this delay may be accomplished with optical delay and weight control may be enabled through electrical and/or optical means.

In an example scenario, weighting in the equalizers may be implemented opto-electrically, in that a phase modulator may be incorporated in one or more arms of an interferometer, resulting in a configurable splitting ratio for the main and FFE paths of the equalizer.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

Figure 1C:
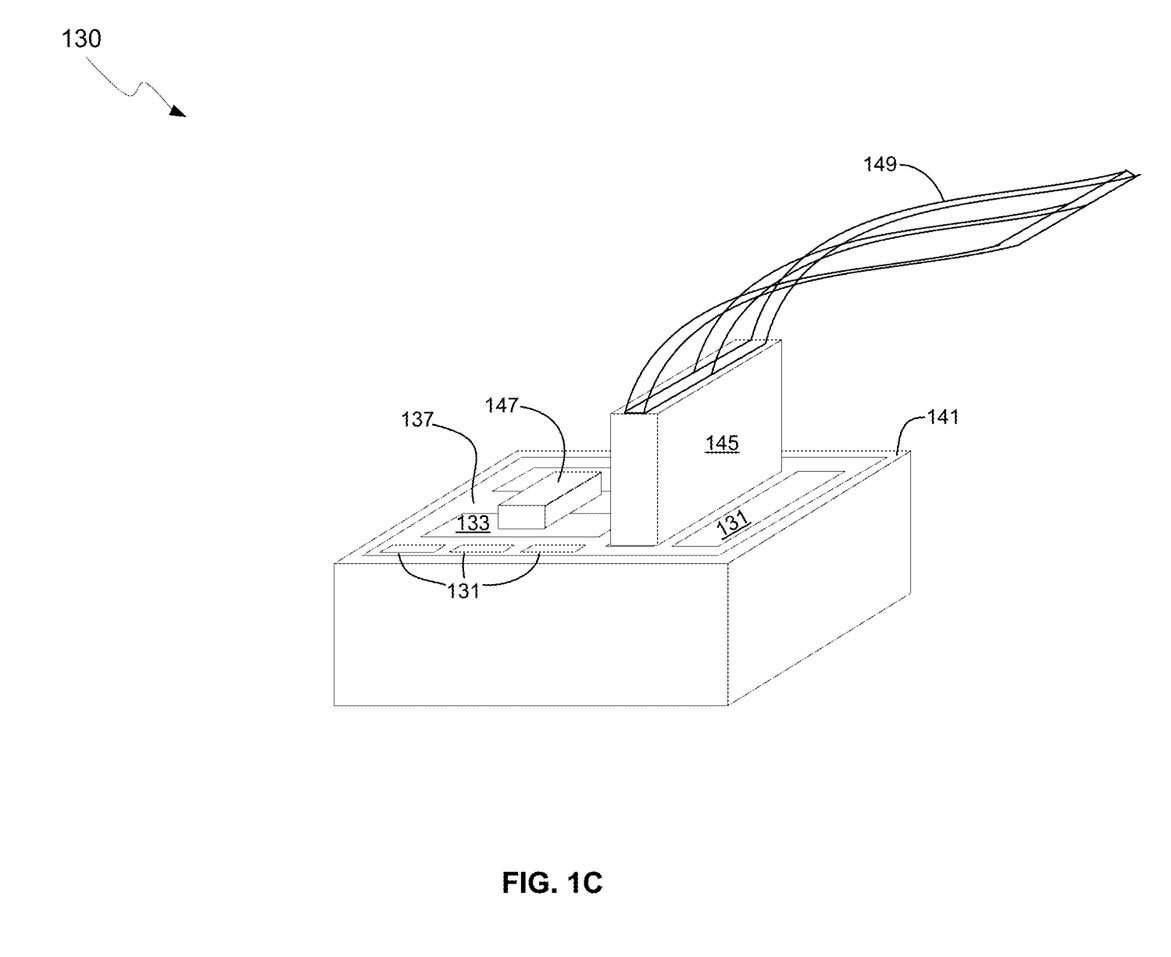
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130. In another example scenario, the IC 130 may comprise photonic devices on one die, such as a photonics interposer, and electrical devices on an electronics die, both of which may comprise CMOS die.

Figure 2:
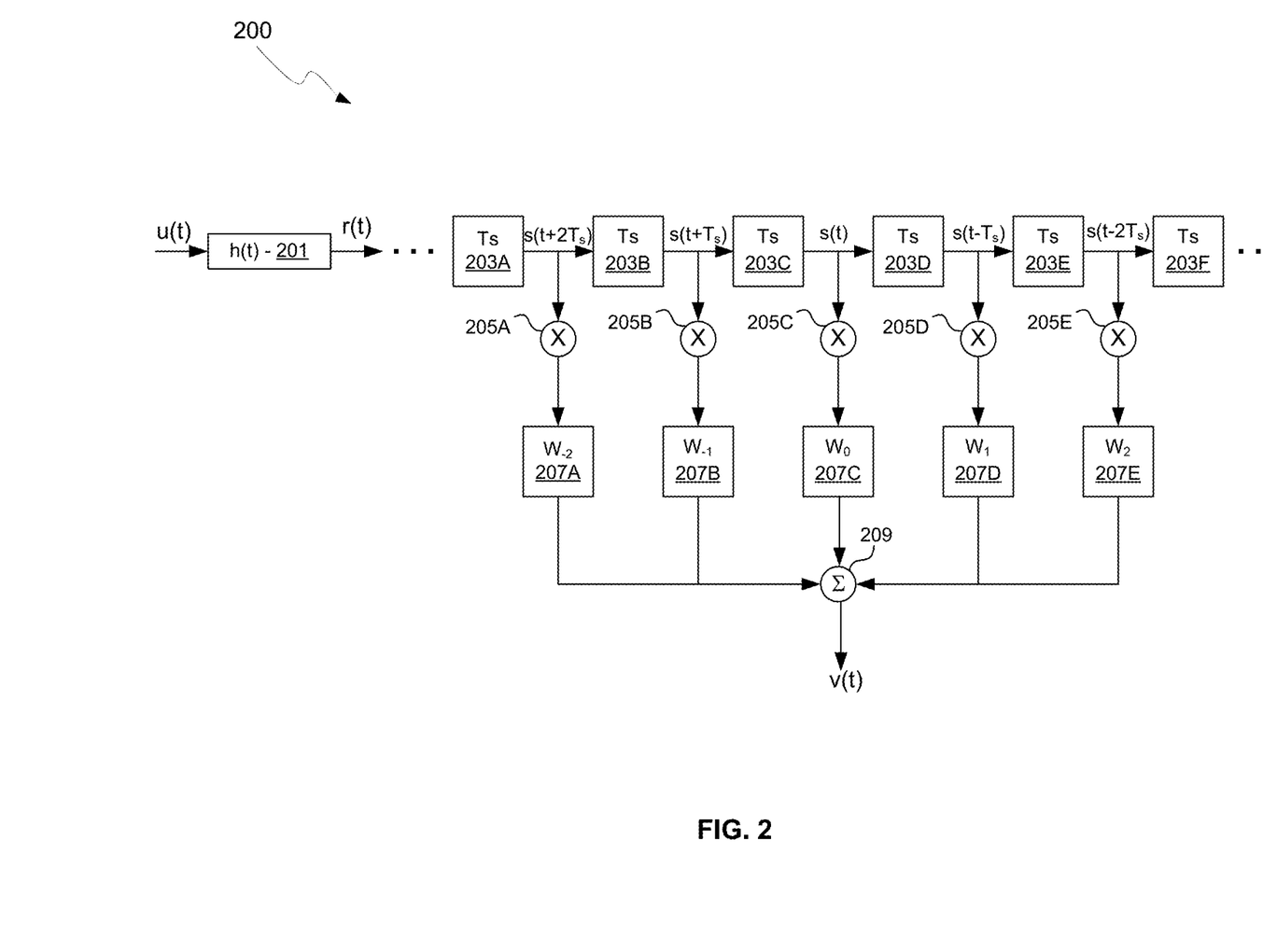
FIG. 2 illustrates an equalizer, in accordance with an example embodiment of the disclosure.

FIG. 2 illustrates an equalizer, in accordance with an example embodiment of the disclosure. Referring to FIG. 2, there is shown an equalizer 200 receiving an input signal u(t), which represents an original clean signal that is subject to the transfer function h(t) of a channel, either Tx or Rx, resulting in a signal with inter-symbol interference (ISI), which may occur in optical communication systems, and may limit the maximum speed of the communication system.

The equalizer 200 comprises a plurality of delay elements 203A-203F, multipliers 205A-205E, weight functions 207A-207E, and a summer 209. The equalizer 200 may generate a delayed version of the original signal r(t) with unintentional ISI utilizing delay elements 203A-203F, resulting in delayed signals s(t). The delayed signals s(t) may each be weighted independently, with $W_N$ being either positive or negative, using the multipliers 205A-205E and weight functions 207A-207E, and then summed using the summer 209 generating an output signal v(t). Theoretically, this structure may remove all ISI in a communication system, although in practical situations, non-idealities may be encountered. These non-idealities may include noise added to the system, non-linearity of elements, variation in delay elements to the symbol period Ts, the weight $W_N$ may not be controllable or accurate, or the summation may not be accurate.

In an example embodiment of the disclosure, the weight, delay, and summing elements may be implemented in the optical domain or a combination of optical and electrical, as described further with respect to FIGS. 3-7.

Figure 3:
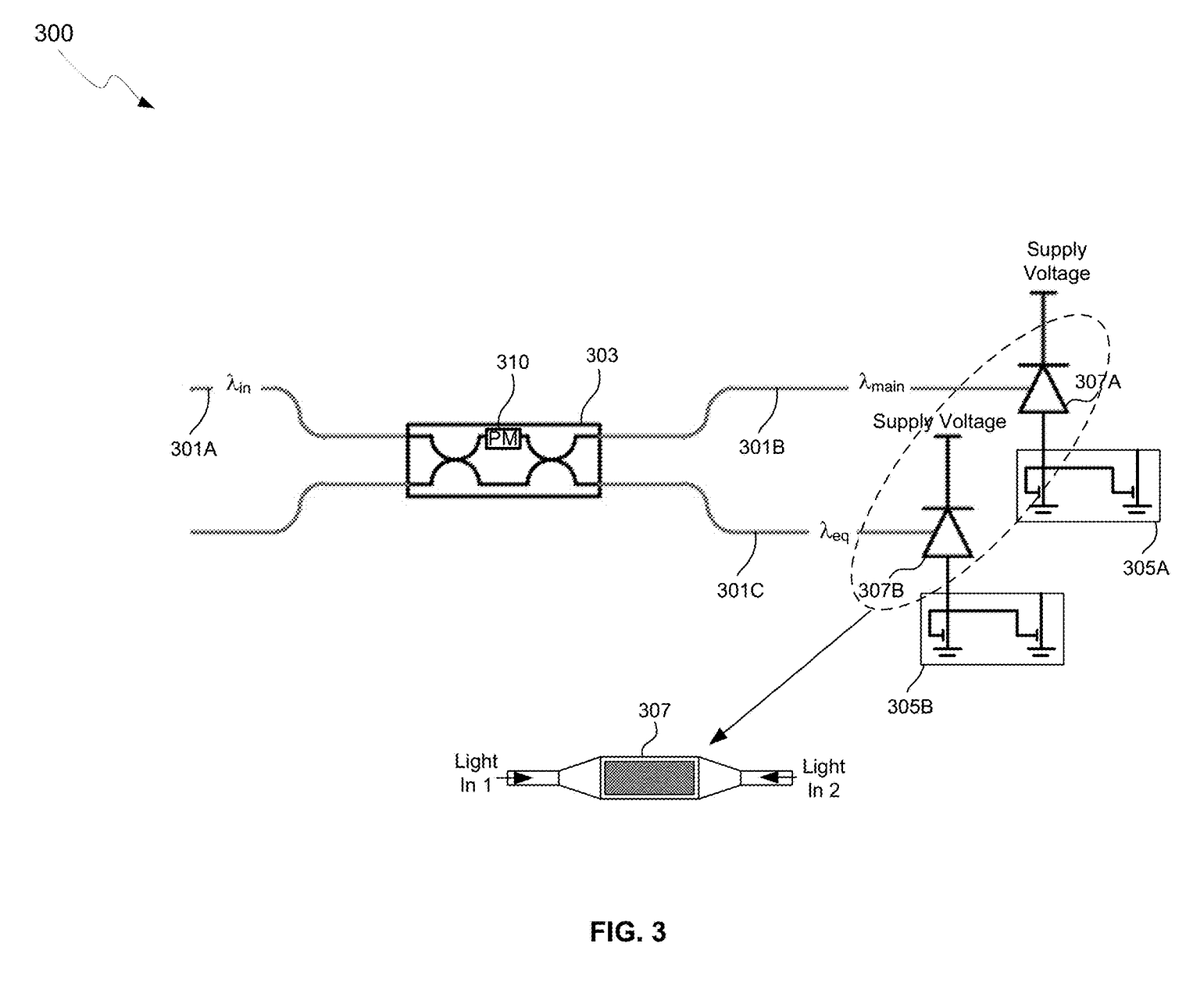
FIG. 3 illustrates signal weighting for an equalizer, in accordance with an example embodiment of the disclosure.

FIG. 3 illustrates signal weighting for an equalizer, in accordance with an example embodiment of the disclosure. Referring to FIG. 3, there is shown equalizer 300 comprising input waveguide 301A, a directional coupler 303, main and equalized waveguides 301B and 301C, photodiodes 307A and 307B, and a current mirror 305A and 305B coupled to each photodiode 307A and 307B. The directional coupler 303 may comprise a stabilized directional coupler with slightly increased length in one arm of the coupler to mitigate process variations or other causes of non-uniformity in optical coupling.

The directional coupler 303 may split the input signal $\lambda_{in}$, into two optical signals, $\lambda_{main}$ and $\lambda_{eq}$, with reasonable precision, and may also comprise a phase modulator 310 comprising a section with p- and n-type regions adjacent to the waveguide for providing a change in dielectric constant with bias, and thus a phase change for the optical signal traveling through the phase modulator 310. The input optical signal, $\lambda_{in}$, may be split by the directional coupler 303 into $\lambda_{main}$ and $\lambda_{eq}$ output signals, where $\lambda_{eq}$ may comprise a percentage X of the input signal and $\lambda_{main}$ comprises 100-X.

Although a single directional coupler 303 with two outputs is shown, the disclosure is not so limited, as multiple directional couplers may be utilized to generate multiple output optical signals. The two optical paths $\lambda_{main}$ and $\lambda_{eq}$ may be separately converted into electrical current signals using the photodiodes 307A and 307B, and the current mirrors 305A and 305B each may amplify the current signal from its corresponding photodiode.

The current mirrors 305A and 305B may comprise two or more CMOS transistors where a drain current through a first CMOS transistor from the associated photodiode is mirrored to the drain of a second CMOS transistor with common gate coupling. The current mirrors 305A and 305B are shown in FIG. 3 as NMOS devices with a supply voltage connected to the photodiode anode, but can also be configured with PMOS devices with ground connected to the photodiode cathode. The current mirrors may be a simple current mirror, or complex current mirror with many devices, where the device mirrors current with a ratio.

The amplification by the current mirrors 305A and 305B may be controlled electrically, such as by configuring gate voltages of CMOS transistors in the current mirror. The overall weight of the equalizer 300 may therefore be implemented with optical and electronic means, namely the optical splitting via directional coupler 303 and electrical amplification of the current mirrors 305A and 305B. With the weighted optical signals converted to electrical current signals, the currents may be summed by shorting the nodes together, such as at the outputs of the current mirrors 305A and 305B.

In addition, one or more photodetectors with multiple waveguide inputs may be utilized for signal summation, as illustrated by the multi-port photodetector 307 in the lower inset of FIG. 3, which comprises a waveguide photodiode with two inputs shown, although other number of inputs is possible. Multi-port photodetectors are described in more detail in U.S. patent application Ser. No. 15/592,774, which is hereby incorporated by reference in its entirety.

Figure 4:
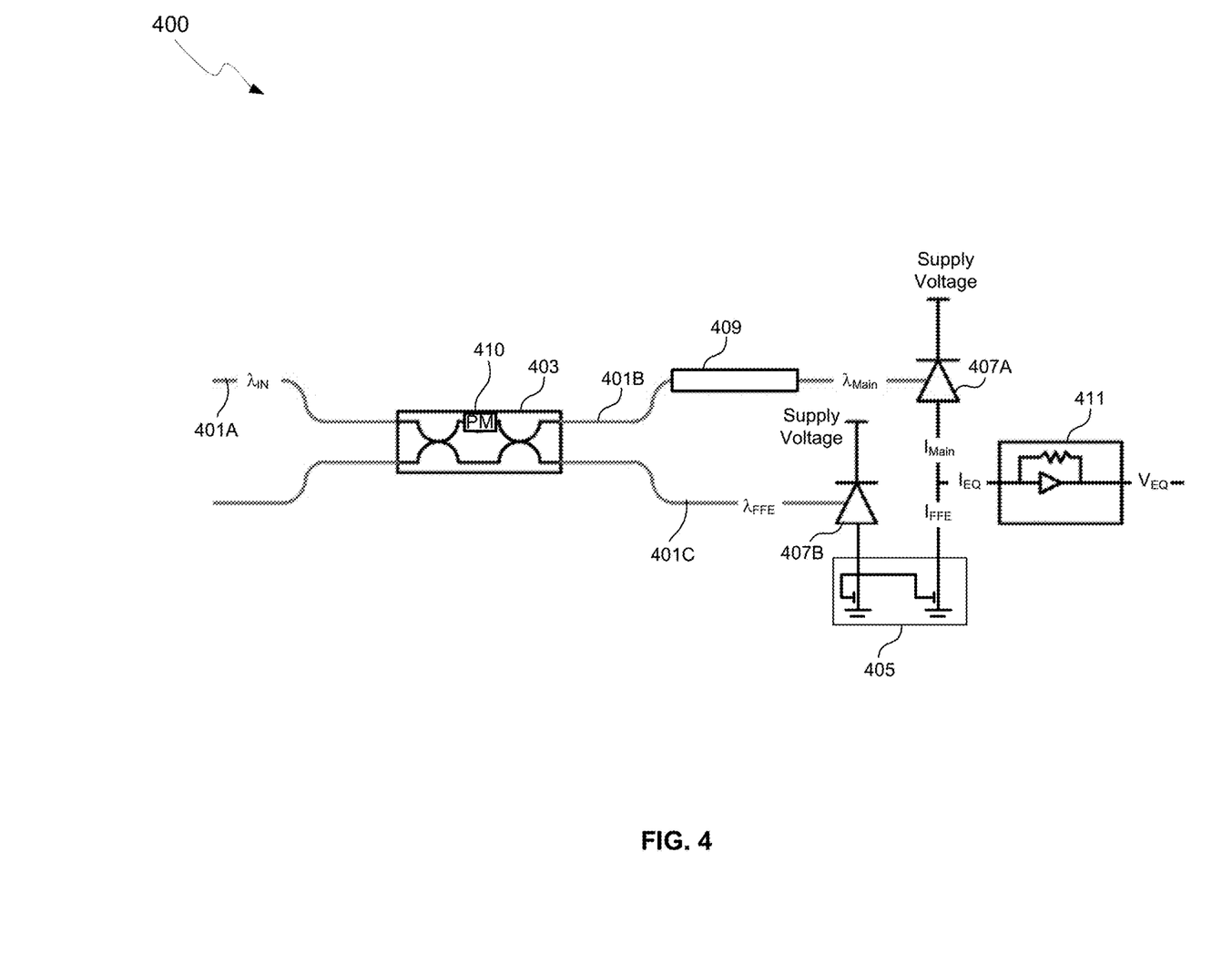
FIG. 4 illustrates a one-tap precursor equalizer with optical and electrical weight control, in accordance with an example embodiment of the disclosure.

FIG. 4 illustrates a one-tap precursor equalizer with optical and electrical weight control, in accordance with an example embodiment of the disclosure. Referring to FIG. 4, there is shown equalizer 400 comprising input waveguide 401A, main and FFE waveguides 401B and 401C, a directional coupler 403, a waveguide delay 409, a pair of photodiodes 407A and 407B, a current mirror 405, and a transimpedance amplifier (TIA) 411. The directional coupler 403, waveguides 401A-401C, current mirror 405, photodiodes 407A and 407B may be share any and all aspects of the directional coupler 303, waveguides 301A-301C, current mirror 305, and photodiodes 307, 307A and 307B described with respect to FIG. 3.

The waveguide delay 409 may comprise an appropriate length waveguide for creating an accurate delay without significant optical power loss. In a typical silicon photonics system, the waveguide delay may comprise a 3 mm waveguide, for example, which may result in ~40 ps of delay, suitable for a 25 G symbol per second signal. The TIA 411 may comprise a gain stage with a feedback impedance comprising a resistor, capacitive, and/or active elements, generating an output voltage proportional to the input current $I_{EQ}$.

In the example scenario of FIG. 4, one-tap precursor equalization may be enabled using summation through current summing and weight control via the directional coupler 403 and current mirror 405. The weight control of the directional coupler 403 may be configurable through control of the phase modulator 410. This electro-optical weight adjustment allows high precision equalization weight optimization as part of a signal processing technique used in data recovery. For example, the eye opening, via correlation between recovering bit and previous or next bit, may be monitored and maximized by adjusting the weight of the equalization through the phase modulator 410, as well as through the current mirror 405.

Example advantages of the current mirror type of weight control are that the current mirror 405 may be accurately adjustable, such as by controlling gate voltages in the current mirror 405, for accurate weight control of the precursor tap, accurate summing may be possible in the current domain at inputs of the TIA 411, for example, and an accurate delay, waveguide delay 409, between the main and precursor tap may be maintained with less variation and power required compared to delay in the electrical domain.

In operation, an input optical signal $\lambda_{IN}$ may be communicated to the directional coupler 403 via input waveguide 401A, and portions of this input signal may be communicated to each of the output waveguides 401B and 401C via the directional coupler 403, with the splitting ratio defined by the coupling ratios of the couplers in the directional coupler 403 and further configured by adjusting the phase modulator 410. Output waveguide 401B may be utilized to couple the directional coupler 403 to the waveguide delay 409 and subsequently to the photodiode 407A, while the other output waveguide 401C is coupled directly to photodiode 407B. The resulting electrical signal from photodiode 407B may be coupled to current mirror 405, with the difference current, $I_{EQ}$, between the output $I_{FFE}$ of the current mirror 405 and the output $I_{Main}$ of the photodiode 407A coupled to the output TIA 411, resulting in an equalized output voltage $V_{EQ}$.

As with the equalizer 300 of FIG. 3, the amplification by the current mirror 405 in the equalizer 400 may be controlled electrically, such as by configuring gate voltages of CMOS transistors in the current mirror 405, for example. The overall weight of the equalizer 400 may therefore be implemented with optical and electronic means, where the optical means comprise the optical splitting via directional coupler 403 and adjusted by phase modulator 410, with delay being provided by the waveguide delay 409, while the electrical means comprise electrical amplification of the current mirror 405. With the weighted optical signals converted to electrical current signals, the currents may be summed by coupling both nodes at the input of the TIA 411.

The adjustable current mirror 405 that provides current amplification enables less signal needed to be tapped from the main path and eliminates extra loading of the sensitive signal path after current to voltage conversion at the TIA 411. This structure also allows the equalization to be powered down completely and can be extended to additional equalization taps if desired. To this end, further directional couplers may be incorporated with additional delay lines, current mirrors, and photodetectors for each additional tap, as illustrated by the multi-tap equalizer schematic in FIG. 2, for example.

Figure 5A:
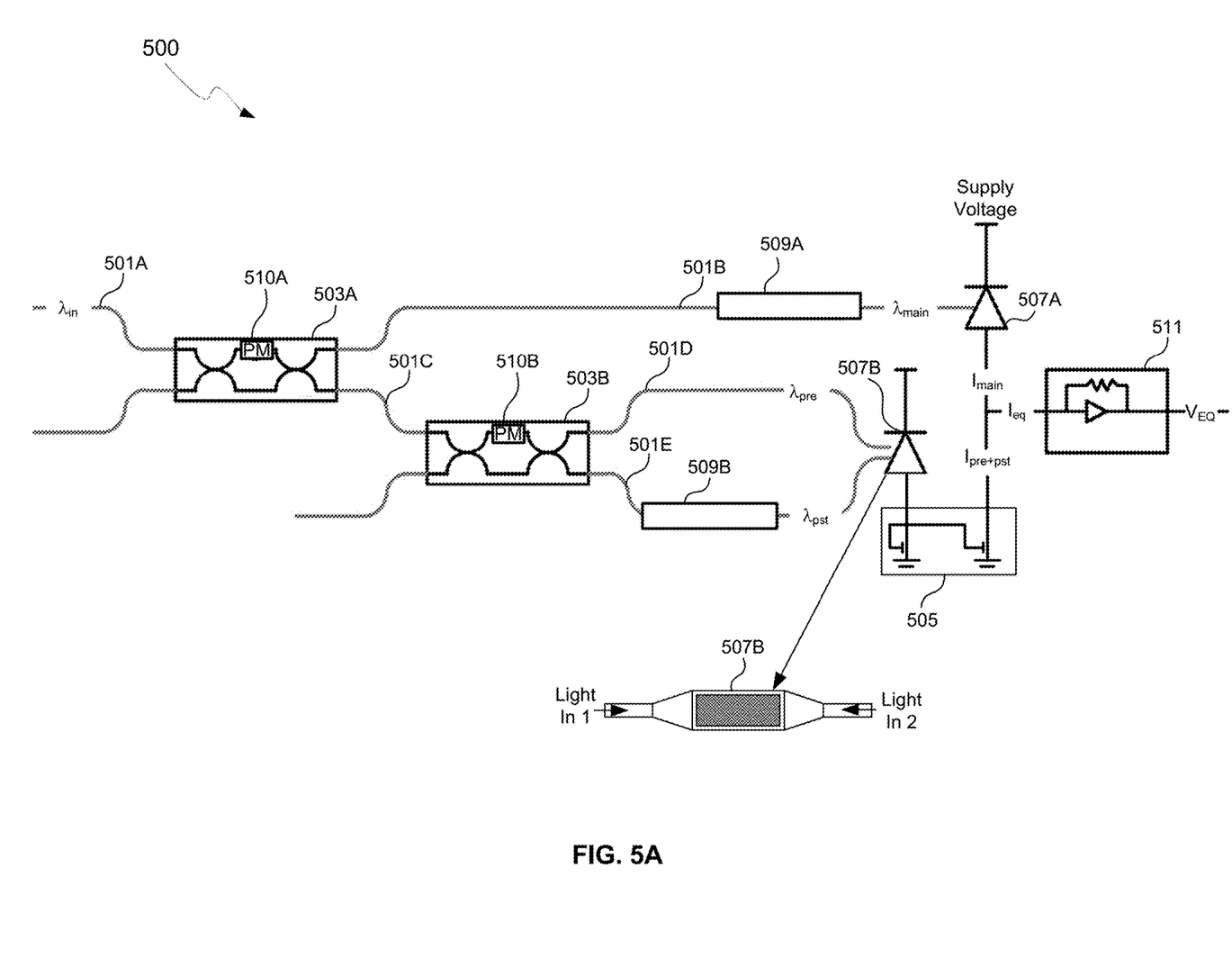
FIG. 5A illustrates a one-tap pre-cursor, one-tap post-cursor equalizer, in accordance with an example embodiment of the disclosure.

FIG. 5A illustrates a one-tap pre-cursor, one-tap post-cursor equalizer, in accordance with an example embodiment of the disclosure. Referring to FIG. 5A, there is shown equalizer 500 comprising waveguides 501A-501E, directional couplers 503A and 503B, waveguide delays 509A and 509B, photodiodes 507A and 507B, a current mirror 505, delay lines 509A and 509B, and a TIA 511.

The directional couplers 503A and 503B, waveguides 501A-501E, current mirror 505, photodiodes 507A and 507B may be share any and all aspects of the directional couplers, waveguides, current mirrors, and photodiodes described with respect to FIGS. 3 and 4, for example. The directional couplers 503A and 503B may each comprise a phase modulator 510A and 510B, respectively, for configuring the splitting ratios of the directional couplers 503A and 503B. In this manner, the weighting of the equalizer 500 may also be configured electro-optically.

The waveguide delays 509A and 509B may each comprise an appropriate length waveguide for creating an accurate delay without significant optical power loss. In an example scenario, the 509B delay is greater than that of 509A to enable post-cursor equalization through the delay 509B path. The TIA 511 may comprise a gain stage with a feedback impedance comprising a resistor, capacitive, and/or active elements, generating an output voltage proportional to the input current $I_{EQ}$.

An input optical signal $\lambda_{in}$ may be received on input waveguide 501A and a portion of the signal may be coupled to each of the output waveguides 501B and 501C of the first directional coupler 503A, with the ratio being tuned via the phase modulator 510A. One output waveguide 501B may be coupled to delay waveguide 509A and subsequently to photodiode 507A. The other output waveguide 501C may be coupled to second directional coupler 503B with phase modulator 510B for configuring the splitting ratio. The outputs of second directional coupler 503B may be coupled to the photodiode 507B via waveguide 501D and also to second waveguide delay 509B via waveguide 501E, which is subsequently coupled to the photodiode 507B. The photodiode 507B comprises a two input port photodiode in this embodiment, as illustrated in the example structure shown in the lower inset of FIG. 5A.

As a two-port photodiode, photodiode 507B provides optical summing of the input optical signals $\lambda_{pre}$ and $\lambda_{pst}$. The current of the photodiode 507B may be amplified/mirrored by the current mirror 505, which may be summed with the current from the photodiode 507A at the TIA 511. The difference current, $I_{EQ}$, between the output $I_{pre+pst}$ of the current mirror 505 and the output $I_{Main}$ of the photodiode 507A may be coupled to the output TIA 511, resulting in an equalized output voltage $V_{EQ}$.

The one-tap pre-cursor, one-tap post-cursor equalization equalizer 500 may utilize both current and optical summing and provide weight control with configurable directional couplers 503A and 503B and a current mirror 505. Example advantages of this embodiment are that the current mirror 505 may be accurately adjustable for accurate weight control of the precursor tap, such as by configuring gate voltages of CMOS transistors in the current mirror 505 accurate summing may be possible in the current domain at the outputs of the photodiodes 507A and 507B, and an accurate delay between the main and precursor tap may be maintained with less variation and power required than when done in the electrical domain. Further example advantages provided by the phase modulator weight control comprise high precision equalization weight optimization, as part of standard signal processing techniques used in data recovery.

As with the equalizers 300 and 400 of FIGS. 3 and 4, the amplification by the current mirror 505 in the equalizer 500 may be controlled electrically. The overall weight of the equalizer 500 may therefore be implemented with optical and electronic means, with the optical means comprising the optical splitting via directional couplers 503A and 503B with electrical control of splitting ratio, delay provided by the delay waveguides 509A and 509B, and optical summing by the photodiode 507B, while the electrical means comprise electrical amplification of the current mirror 505. With the weighted optical signals converted to electrical current signals, the currents may be summed by coupling both nodes at the input of the TIA 511.

Further example advantages of the embodiment shown in FIG. 5A are that an adjustable current mirror 505 with amplification allows for less signal to be tapped from the main path $\lambda_{main}$, and the equalization path may be shut down completely if desired, eliminating extra loading of the sensitive signal path after current to voltage conversion by the TIA. Finally, the one-tap pre-cursor, one-tap post-cursor equalization equalizer 500 may achieve multi-tap equalization with a single photodiode/current mirror structure and may be extended to additional equalization steps if desired. To this end, further directional couplers may be incorporated with additional delay lines, current mirrors, and photodetectors for each additional tap, as illustrated by the multi-tap equalizer schematic in FIG. 2, for example.

Figure 5B:
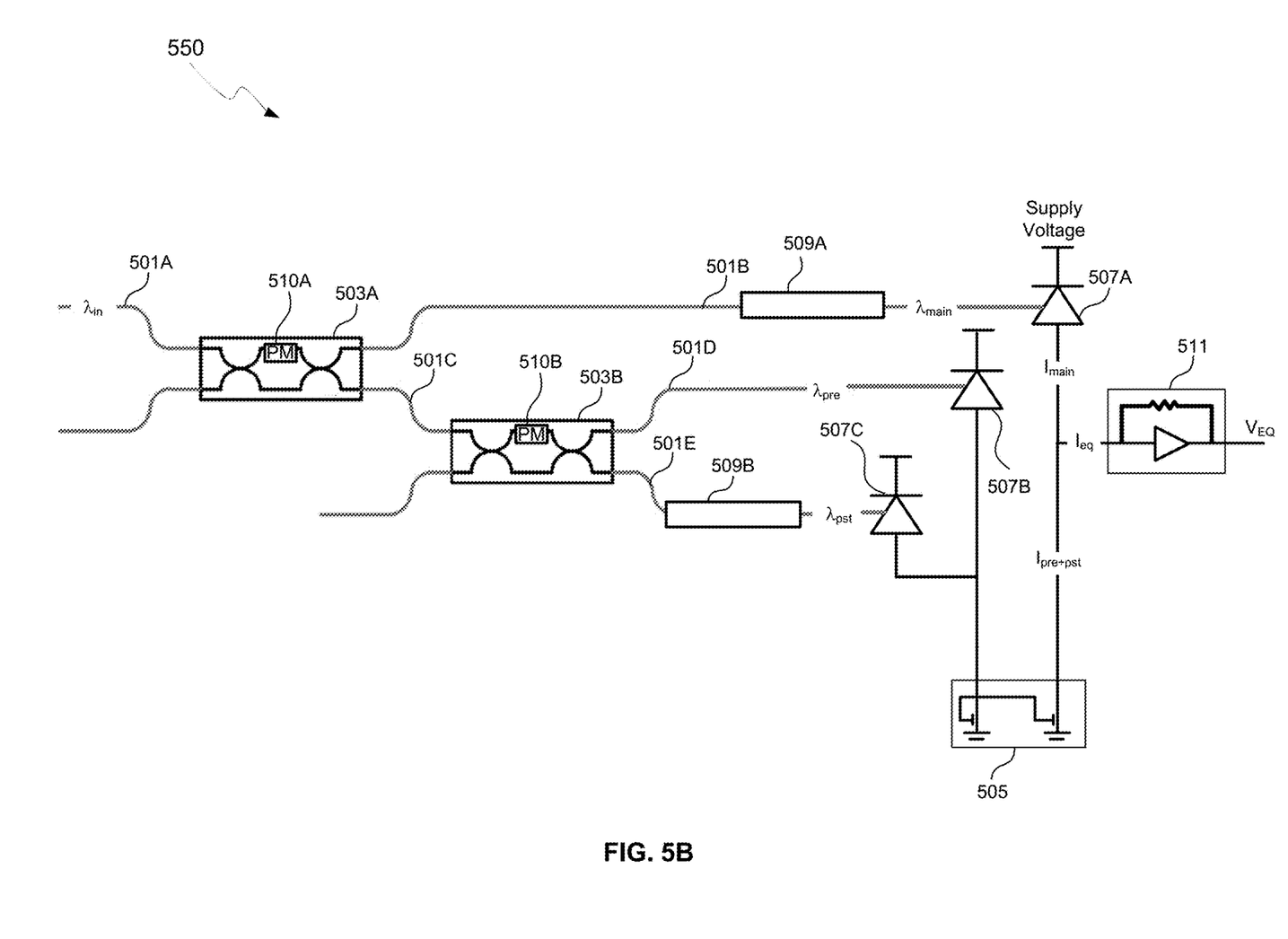
FIG. 5B illustrates another example of a one-tap pre-cursor, one-tap post-cursor equalizer, in accordance with an example embodiment of the disclosure.

FIG. 5B illustrates another example of a one-tap pre-cursor, one-tap post-cursor equalizer, in accordance with an example embodiment of the disclosure. Referring to FIG. 5B, there is shown equalizer 550 comprising waveguides 501A-501E, two directional couplers 503A and 503B, two waveguide delays 509A and 509B, two photodiodes 507A-507C, a current mirror 505, delay lines 509A and 509B, and a TIA 511.

The directional couplers 503A and 503B, waveguides 501A-501E, current mirror 505, photodiodes 507A-507C may be share any and all aspects of the directional couplers, waveguides, current mirrors, and photodiodes described with respect to FIGS. 3, 4, and 5A, for example. The directional couplers 503A and 503B may each comprise a phase modulator 510A and 510B, respectively, for configuring the splitting ratios of the directional couplers 503A and 503B. In this manner, the weighting of the equalizer 500 may also be configured electro-optically.

The waveguide delays 509A and 509B may each comprise an appropriate length waveguide for creating an accurate delay without significant optical power loss. In an example scenario, the 509B delay is greater than that of 509A to enable post-cursor equalization through the delay 509B path. The TIA 511 may comprise a gain stage with a feedback impedance comprising a resistor and/or active elements, generating an output voltage proportional to the input current $I_{EQ}$.

In operation, an input optical signal $\lambda_{in}$ may be received on input waveguide 501A and a portion of the signal may be coupled to each of the output waveguides 501B and 501C of the first directional coupler 503A, with the splitting ratio being configured by the phase modulator 510A. One output waveguide 501B of the directional coupler 503A may be coupled to delay waveguide 509A and subsequently to photodiode 507A. The other output waveguide 501C may be coupled to second directional coupler 503B, with the splitting ratio configured by the phase modulator 510B. The outputs of the directional coupler 503B may be coupled to the photodiode 507B via waveguide 501D and to second waveguide delay 509B via waveguide 501E, which is subsequently coupled to the photodiode 507C. The output voltage $V_{EQ}$ may be processed, using software and/or hardware to then adjust weight at various devices, such as the phase modulators 510A/510B and/or current mirror 505, for example.

In the example shown in FIG. 5B, as compared to the example shown in FIG. 5A, the multi-port photodiode 507B is replaced with two photodiodes 507B and 507C, with their output currents summed by coupling their output terminals, cathodes in this example, and then mirrored by the current mirror 505. The resulting current may be summed with the current from the photodiode 507A at the TIA 511. The difference current, $I_{EQ}$, between the output $I_{pre+pst}$ of the current mirror 505 and the output $I_{Main}$ of the photodiode 507A may be coupled to the output TIA 511, resulting in an equalized output voltage $V_{EQ}$.

The one-tap pre-cursor, one-tap post-cursor equalization equalizer 550 may utilize current summing and provide weight control with phase modulator configured directional couplers 503A and 503B and electrically controlled current mirror 505. Example advantages of this embodiment are that the phase modulator weight control provides high precision equalization weight optimization as part of standard signal processing techniques used in data recovery, the current mirror 505 may be accurately adjustable, such as by configuring gate voltages of CMOS transistors in the current mirror 505, for accurate weight control of the precursor tap, accurate summing may be possible in the current domain at the outputs of the photodiodes 507A-507C, and an accurate delay between the main and precursor tap may be maintained with less variation and power required than when done in the electrical domain.

As with the equalizers 300 and 400 of FIGS. 3 and 4, the amplification by the current mirror 505 in the equalizer 550 may be controlled electrically. The overall weight of the equalizer 550 may therefore be implemented with optical and electronic means, with the optical means comprising the optical splitting via directional couplers 503A and 503B configured by the phase modulators 510A and 510B and optical delay provided by the delay waveguides 509A and 509B, while the electrical means comprise electrical amplification of the current mirror 505 and current summing of the output currents of the photodiodes 507A-507C.

Further example advantages of the embodiment shown in FIG. 5B are that an adjustable current mirror 505 with amplification allows for less signal to be tapped from the main path $\lambda_{main}$, as controlled by the phase modulators 510A and 510B, and the equalization path may be shut down completely if desired, eliminating extra loading of the sensitive signal path after current to voltage conversion by the TIA. The output voltage $V_{EQ}$ may be processed, using software and/or hardware to then adjust weight at various devices, such as the phase modulators 510A/510B, current mirror 505, and/or TIA 511 for example.

Finally, the one-tap pre-cursor, one-tap post-cursor equalization equalizer 550 may achieve multi-tap equalization with a multiple photodiode/single current mirror structure and may be extended to additional equalization steps if desired. To this end, further directional couplers may be incorporated with additional delay lines, current mirrors, and photodetectors for each additional tap, as illustrated by the multi-tap equalizer schematic in FIG. 2, for example.

Figure 6:
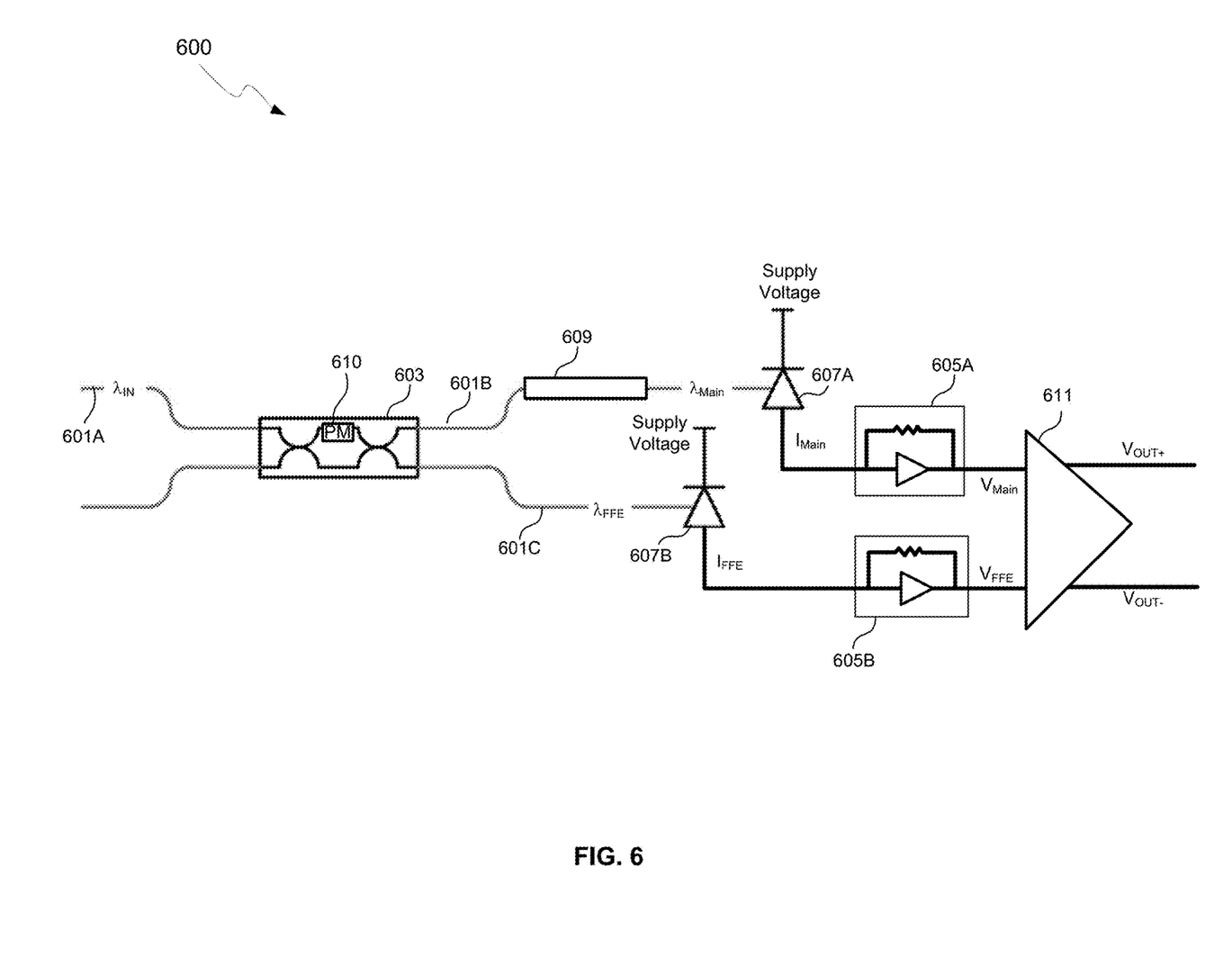
FIG. 6 illustrates a waveguide delay-based single-ended to differential circuit, in accordance with an example embodiment of the disclosure.

FIG. 6 illustrates a waveguide delay-based single-ended to differential circuit, in accordance with an example embodiment of the disclosure. Referring to FIG. 6, there is shown equalizer 600 comprising input waveguide 601A, main and FFE waveguides 601B and 601C, a directional coupler 603, a waveguide delay 609, a pair of photodetectors 607A and 607B, transimpedance amplifiers (TIAs) 605A and 605B, and gain stage 611.

The waveguide delay 609 may comprise an appropriate length waveguide for creating an accurate delay without significant optical power loss. In a typical silicon photonics system, the waveguide delay may comprise a 3 mm waveguide, for example, which may result in ~40 ps of delay, suitable for a 25 G symbol per second signal. The TIAs 605A and 605B may each comprise a gain stage with a feedback impedance comprising a resistor, capacitor, and/or active elements, generating an output voltage proportional to the input current.

In operation, an input optical signal, $\lambda_{IN}$, may be communicated to the directional coupler 603 via input waveguide 601A, and portions of this input signal may be communicated to each of the output waveguides 601B and 601C via the directional coupler 603. Output waveguide 601B may be utilized to couple the directional coupler 603 to the waveguide delay 609 and subsequently to the photodetector 607A, while the other output waveguide 601C is coupled directly to photodetector 607B. The resulting electrical signal from photodetector 607B may be coupled to TIA 605B.

The electrical currents generated by the photodetectors 607A and 607B may be coupled to the TIAs 605A and 605B, respectively, which may generate output voltages proportional to the difference of received photocurrents $I_{FFE}$ and $I_{MAIN}$. While the example shown in FIG. 6 shows the photodetectors with anode coupled to a supply voltage and cathode coupled to the TIAs, they may instead be configured with cathode coupled to ground and anode coupled to the TIAs.

The gain stage 611 may amplify the voltages generated by the TIAs 605A and 605B, thereby generating a differential output voltage proportional to the difference of the two optical signals, and thus the equalized version of the input optical signal $\lambda_{IN}$.

In an example scenario, the weight factors in the equalizing of the received signals may be implemented optically but controlled electrically. To this end, the splitting ratio in the directional coupler 603 may be configured by controlling the bias of the phase modulator 610. In addition, electrical weighting of the optical signals $\lambda_{main}$ and $\lambda_{ffe}$ may be achieved by configuring the gain of the TIAs 605A and 605B, as this configuring of the gain thus determines the weight of the optical signal that generated the photo-generated current.

The directional coupler 603 splits the received optical signal into two optical signals with good precision controlled by the phase modulator 610, and cascading directional couplers may be utilized to create multiple optical signals. These optical paths may each be separately converted by a photodetector to an electrical current signal.

In the example equalizer 600 of FIG. 6, the summing, in this case summing with negative weight W, occurs after transimpedance amplification, i.e., the differential voltage amplification by the gain stage 611. The main signal path with optical signal $\lambda_{main}$ may be converted to a single voltage signal using TIA 605A. This voltage is used as a positive voltage coupled to a voltage amplifier, gain stage 611. Each weighted signal may be converted into current and then combined, in this example $\lambda_{FFE}$ being converted to a photo-generated current from the photodetector 607B. TIA 605B is then used to convert the received current into a voltage, which may be used as a negative voltage signal of a differential voltage amplifier, gain stage 611. Optionally, the gain of TIA 605B may be adjustable to further adjust gain. This voltage forms the negative voltage of a differential voltage signal at the output of gain stage 611.

Figure 7:
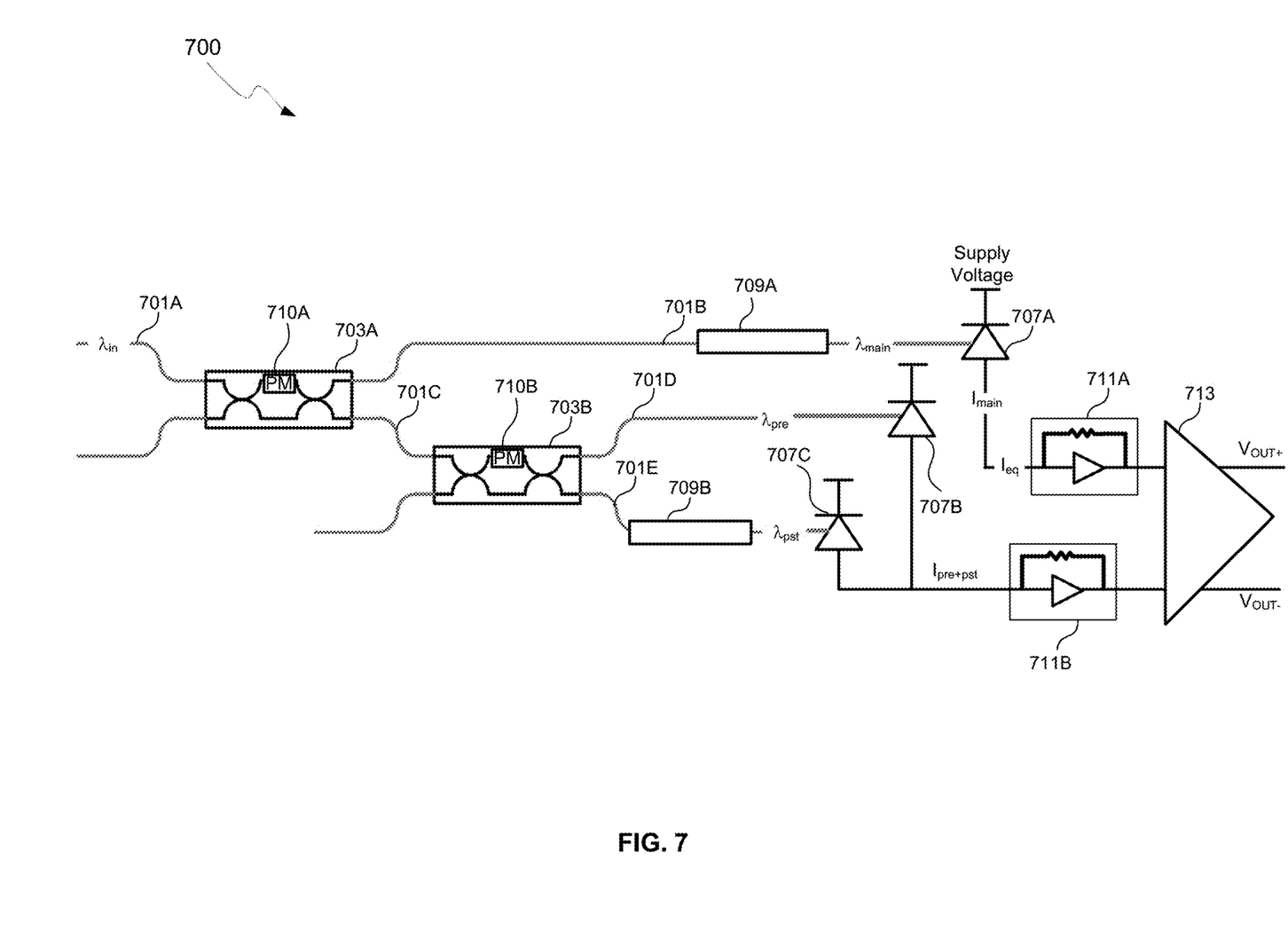
FIG. 7 illustrates another example of a waveguide delay-based single-ended to differential circuit, in accordance with an example embodiment of the disclosure.

FIG. 7 illustrates another example of a waveguide delay-based single-ended to differential circuit, in accordance with an example embodiment of the disclosure. Referring to FIG. 7, there is shown equalizer 700 comprising waveguides 701A-701E, two directional couplers 703A and 703B, two waveguide delays 709A and 709B, two photodiodes 707A-707C, a current mirror 705, delay lines 709A and 709B, TIAs 711A and 711B, and gain stage 713.

The directional couplers 703A and 703B, waveguides 701A-701E, current mirror 705, photodiodes 507A-507C, TIAs 711A and 711B, and gain stage 713 may be share any and all aspects of the directional couplers, waveguides, photodiodes, TIAs, and gain stages described with respect to FIGS. 2-6, for example. Accordingly, the directional couplers 703A and 703B comprise phase modulators 710A and 710B for configuring the relative magnitude of output signals at its outputs, i.e., the splitting ratio. While the example shown in FIG. 7 shows the photodetectors with anode coupled to a supply voltage and cathode coupled to the TIAs, they may instead be configured with cathode coupled to ground and anode coupled to the TIAs.

The waveguide delays 709A and 709B may each comprise an appropriate length waveguide for creating an accurate delay without significant optical power loss. In an example scenario, the waveguide delay 709B is greater than that of 709A to enable post-cursor equalization through the delay 709B path. The TIAs 711A and 711B may comprise a gain stage with a feedback impedance comprising a resistor, capacitive, and/or active elements, generating an output voltage proportional to the input current.

In operation, an input optical signal $\lambda_{in}$ may be received on input waveguide 701A and a portion of the signal may be coupled to each of the output waveguides 701B and 701C of the first directional coupler 703A, with its splitting ratio tuned by the phase modulator 710A. One output waveguide 701B of the directional coupler 703A may be coupled to delay waveguide 709A and subsequently to photodiode 707A. The other output waveguide 701C of the directional coupler 703A may be coupled to second directional coupler 703B, with the directional coupler splitting ratio configured by the phase modulator 710B. The outputs of the directional coupler 703B may be coupled to the photodiode 707B via waveguide 701D and to second waveguide delay 709B via waveguide 701E, which is subsequently coupled to the photodiode 707C.

In the example shown in FIG. 7, the two photodiodes 707B and 707C generate output currents that are summed by coupling their output terminals, cathodes in this example. The summed current may then be converted to a voltage using the TIA 711B.

In the example equalizer 700 of FIG. 7, the summing, in this case summing with negative weight W, occurs after transimpedance amplification, i.e., the differential voltage amplification by the gain stage 713. The main signal path with optical signal $\lambda_{main}$ may be converted to a single voltage signal using TIA 711A. This voltage is used as a positive voltage coupled to a voltage amplifier, gain stage 713. Each weighted signal may be converted into current and then combined, in this example $\lambda_{pre}$ being converted to a photo-generated current by the photodetector 707B and $\lambda_{pst}$ being converted to a photo-generated current by the photodetector 707C. TIA 711B is then used to convert the received current into a voltage, which may be used as a negative voltage signal of differential voltage amplifier, gain stage 713. Optionally, the gain of TIA 711B may be adjustable to further adjust gain. This voltage forms the negative voltage of a differential voltage signal at the output of gain stage 713.

In another example scenario, the photodiodes 707B and 707C may be a multi-input photodetector that outputs a photogenerated current from two input optical signals, thereby providing optical summing in the equalizer 700.

In this example, a one-tap precursor equalization is demonstrated where the summation is by voltage summing at the output gain stage 713, and the weight control is via the directional couplers 703A and 703B, configured by phase modulators 710A and 710B, and precursor TIA 711B gain. For example, the weighting may be configured by configuring the directional coupler 703A to have a small portion of the input optical signal $\lambda_{main}$ coupled to the output waveguide 701C and most of the input optical signal $\lambda_{main}$ coupled to output waveguide 701B. The output voltage may be processed, using software and/or hardware to then adjust weight at various devices, such as the phase modulators 710A/710B and/or TIAs 711A/711B, for example.

Example advantages of this example scenario are that the voltage summing is accomplished conveniently in single-ended to differential conversions with the single-ended TIA structure, the paths may be physically identical for the main and precursor tap which facilitates delay matching, it is compatible with optical summing, and weight can be adjusted with accurate splitting ratios of the directional couplers 703A and 703B and accurate TIA 711A and 711B control.

In an example embodiment of the disclosure, a method and system is described for waveguide delay based equalization with optical splitting in optical communication. The system may comprise an optoelectronic circuit comprising an input waveguide, a directional coupler, an optical delay, photodetectors, a current mirror, and a transimpedance amplifier.

The optoelectronic circuit may be operable to receive an input optical signal via the input waveguide, split the input optical signal into first and second output signals using the directional coupler, delay the first output signal using the optical delay, convert the delayed first output signal to a first electrical signal using a first photodetector, convert the second output signal to a second electrical signal using a second photodetector, amplify the second electrical signal using the current mirror, and sum the first and second electrical signals at inputs of the transimpedance amplifier to generate an output voltage. The optoelectronic circuit may be operable to split the second output signal into third and fourth output signals using a second directional coupler.

The optoelectronic circuit may be operable to delay the fourth optical signal using a second optical delay. The first and second photodetectors may comprise different input ports of a multi-port photodiode. The optoelectronic circuit may be operable to configure a splitting ratio between the first and second output signals using phase control in the directional coupler. The optoelectronic circuit may be operable to provide equalization to the received input signal with optical weighting using the optical delay and electrical weighting by controlling the current mirror.

In another example embodiment of the disclosure, a method and system is described for waveguide delay based equalization with optical splitting in optical communication. The system may comprise an optoelectronic circuit comprising an input waveguide, a directional coupler, an optical delay, photodetectors, transimpedance amplifiers, and an output gain stage.

The optoelectronic circuit may be operable to receive an input optical signal via the input waveguide, split the input optical signal into first and second output signals using the directional coupler, delay the first output signal using the optical delay, convert the delayed first output signal to a first electrical current using a first photodetector, convert the second output signal to a second electrical current using a second photodetector, convert the first and second electrical currents to first and second voltages using first and second transimpedance amplifiers, and generate a differential output voltage based on the first and second voltages using the output gain stage.

The optoelectronic circuit may be operable to split the second output signal into third and fourth output signals using a second directional coupler. The optoelectronic circuit may be operable to delay the fourth optical signal using a second optical delay. The first and second photodetectors may comprise different input ports of a multi-port photodiode. The optoelectronic circuit may be operable to configure a splitting ratio between the first and second output signals using phase control in the directional coupler. The optoelectronic circuit may be operable to provide equalization to the received input signal with optical weighting using the optical delay and electrical weighting by controlling the current mirror.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in an optoelectronic circuit comprising an input waveguide, a directional coupler, an optical delay, photodetectors, a current mirror, and a transimpedance amplifier:
   receiving an input optical signal via the input waveguide;
   splitting the input optical signal into first and second output signals using the directional coupler;
   delaying the first output signal using the optical delay;
   converting the delayed first output signal to a first electrical signal using a first photodetector;
   converting the second output signal to a second electrical signal using a second photodetector;
   amplifying the second electrical signal using the current mirror; and
   summing the first and second electrical signals at inputs of the transimpedance amplifier to generate an output voltage.

2. The method according to claim 1, comprising splitting the second output signal into third and fourth output signals using a second directional coupler.

3. The method according to claim 2, comprising delaying the fourth optical signal using a second optical delay.

4. The method according to claim 1, wherein the first and second photodetectors comprise different input ports of a multi-port photodiode.

5. The method according to claim 1, comprising configuring a splitting ratio between the first and second output signals using phase control in the directional coupler.

6. The method according to claim 1, comprising providing equalization to the received input optical signal using optical delay, optical weighting, and electrical weighting by controlling the current mirror.

7. A system for communication, the system comprising:
   an optoelectronic circuit comprising an input waveguide, a directional coupler, an optical delay, photodetectors, a current mirror, and a transimpedance amplifier, the optoelectronic circuit being operable to:
   receive an input optical signal via the input waveguide;
   split the input optical signal into first and second output signals using the directional coupler;
   delay the first output signal using the optical delay;
   convert the delayed first output signal to a first electrical signal using a first photodetector;
   convert the second output signal to a second electrical signal using a second photodetector;
   amplify the second electrical signal using the current mirror; and
   sum the first and second electrical signals at inputs of the transimpedance amplifier to generate an output voltage.

8. The system according to claim 7, wherein the optoelectronic circuit is operable to split the second output signal into third and fourth output signals using a second directional coupler.

9. The system according to claim 8, wherein the optoelectronic circuit is operable to delay the fourth optical signal using a second optical delay.

10. The system according to claim 7, wherein the first and second photodetectors comprise different input ports of a multi-port photodiode.

11. The system according to claim 7, wherein the optoelectronic circuit is operable to configure a splitting ratio between the first and second output signals using phase control in the directional coupler.

12. The system according to claim 7, wherein the optoelectronic circuit is operable to provide equalization to the received input optical signal using optical delay, optical weighting, and electrical weighting by controlling the current mirror.

13. A method for communication, the method comprising:
   in an optoelectronic circuit comprising an input waveguide, a directional coupler, an optical delay, photodetectors, transimpedance amplifiers, and an output gain stage:
   receiving an input optical signal via the input waveguide;
   splitting the input optical signal into first and second output signals using the directional coupler;
   delaying the first output signal using the optical delay;
   converting the delayed first output signal to a first electrical current using a first photodetector;
   converting the second output signal to a second electrical current using a second photodetector;
   converting the first and second electrical currents to first and second voltages using first and second transimpedance amplifiers; and
   generating a differential output voltage based on the first and second voltages using the output gain stage.

14. The method according to claim 13, comprising splitting the second output signal into third and fourth output signals using a second directional coupler.

15. The method according to claim 14, comprising delaying the fourth optical signal using a second optical delay.

16. The method according to claim 13, wherein the first and second photodetectors comprise different input ports of a multi-port photodiode.

17. The method according to claim 13, comprising configuring a splitting ratio between the first and second output signals using phase control in the directional coupler.

18. The method according to claim 13, comprising providing equalization to the received input optical signal using optical delay, optical weighting, and electrical weighting.

19. A system for communication, the system comprising:
an optoelectronic circuit comprising an input waveguide, a directional coupler, an optical delay, photodetectors, transimpedance amplifiers, and an output gain stage, the optoelectronic circuit being operable to:
receive an input optical signal via the input waveguide;
split the input optical signal into first and second output signals using the directional coupler;
delay the first output signal using the optical delay;
convert the delayed first output signal to a first electrical current using a first photodetector;
convert the second output signal to a second electrical current using a second photodetector;
convert the first and second electrical currents to first and second voltages using first and second transimpedance amplifiers; and
generate a differential output voltage based on the first and second voltages using the output gain stage.

20. The system according to claim 19, wherein the optoelectronic circuit is operable to split the second output signal into third and fourth output signals using a second directional coupler.

21. The system according to claim 20, wherein the optoelectronic circuit is operable to delay the fourth optical signal using a second optical delay.

22. The system according to claim 19, wherein the first and second photodetectors comprise different input ports of a multi-port photodiode.

23. The system according to claim 19, wherein the optoelectronic circuit is operable to configure a splitting ratio between the first and second output signals using phase control in the directional coupler.

24. The system according to claim 19, wherein the optoelectronic circuit is operable to provide equalization to the received input signal using optical delay, optical weighting, and electrical weighting.

* * * * *